Sept. 24, 1963  M. J. DUER  3,104,962
SELF-CLEANING AIR FILTER

Filed Dec. 11, 1958  6 Sheets-Sheet 1

INVENTOR.
Morris J. Duer
BY
*L.D.Burch*
ATTORNEY

Sept. 24, 1963  M. J. DUER  3,104,962
SELF-CLEANING AIR FILTER
Filed Dec. 11, 1958  6 Sheets-Sheet 2

INVENTOR.
Morris J. Duer
BY
D. D. Burch
ATTORNEY

Sept. 24, 1963 M. J. DUER 3,104,962
SELF-CLEANING AIR FILTER
Filed Dec. 11, 1958 6 Sheets-Sheet 3

INVENTOR.
Morris J. Duer
BY
L. D. Burch
ATTORNEY

Sept. 24, 1963　　　M. J. DUER　　　3,104,962
SELF-CLEANING AIR FILTER
Filed Dec. 11, 1958　　　　　　　　　　　　6 Sheets-Sheet 4
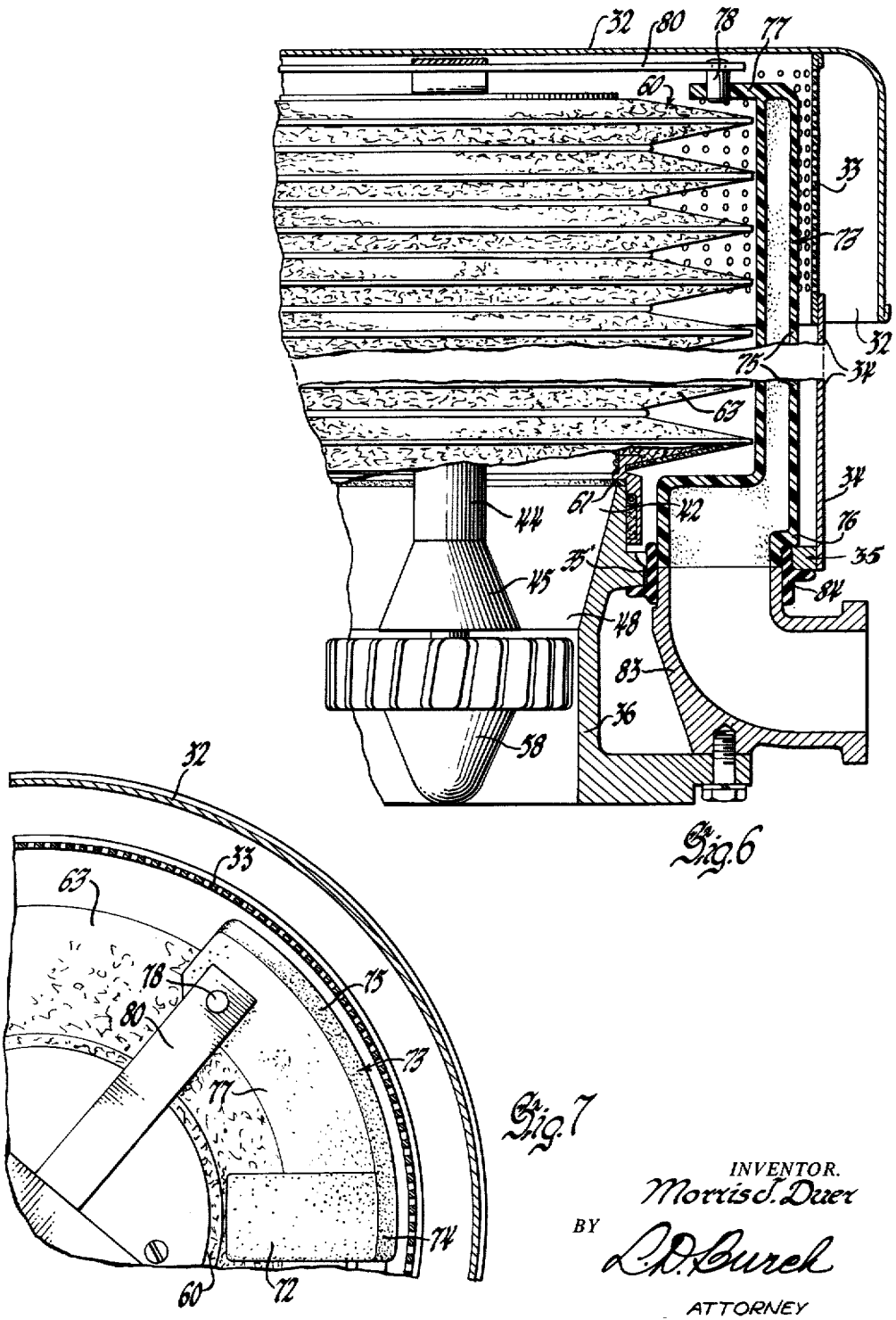
INVENTOR.
Morris J. Duer
BY
L. D. Burek
ATTORNEY INVENTOR.
Morris J. Duer
BY
L.D. Burch
ATTORNEY

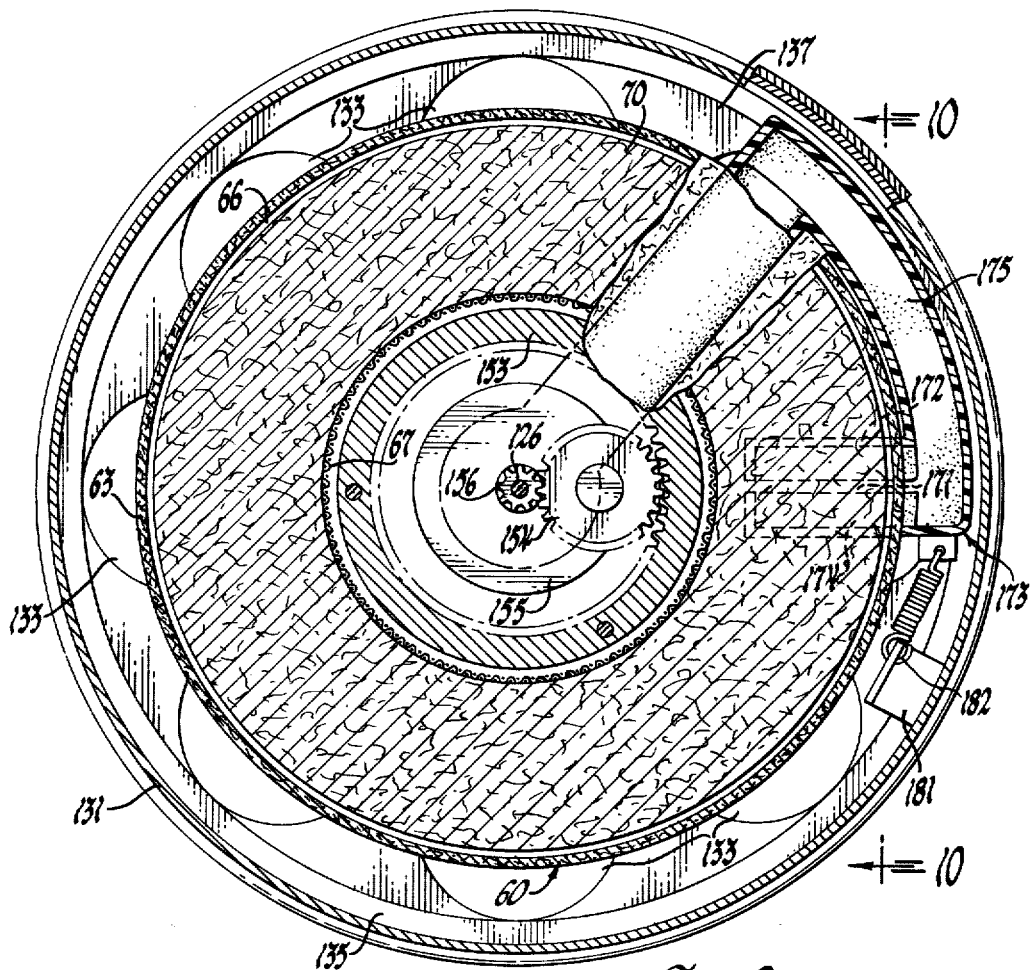
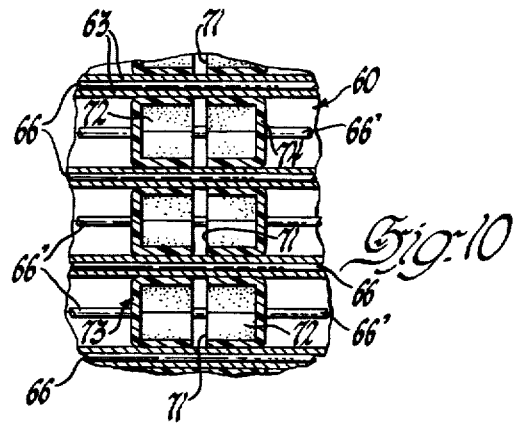

United States Patent Office 3,104,962
Patented Sept. 24, 1963

1

3,104,962
SELF-CLEANING AIR FILTER
Morris J. Duer, Dayton, Ohio, assignor to General
Motors Corporation, Detroit, Mich., a corporation of
Delaware
Filed Dec. 11, 1958, Ser. No. 779,781
9 Claims. (Cl. 55—302)

This invention relates generally to air cleaners; more particularly to a self-cleaning air filter mountable in the air intake of a device such as an internal combustion engine, a building or vehicle compartment ventilating system, or the like requiring relatively large quantities of very clean air for the safe and efficient operation thereof; and with regard to certain more specific features of the invention, to a self-contained, self-cleaning air filter mountable in such an air induction system free of external driving connections and filter cleaning vacuum or pressure connections with the other components of the associated device or system.

Though a variety of devices have been provided for supplying large quantities of clean air, there is still a need for better and more efficient air cleaners. Presently used intake air cleaners of the filter type either do not supply the required volume of air without excessive intake restriction through the filter unit or permit pullover of filter fibers, of filter wetting lubricants and of the impurities collected by the filter and the filter element must be frequently replaced or cleaned if the intake air is to be properly cleaned. Any filter intake restriction necessarily decreases the air capacity of the system while imposing additional load on the induction creating means and generally requires a corresponding increase in the size of the filter unit. Lubricant pullover is not only undesirable in most instances but may even be extremely dangerous in certain ventilating installations and in internal combustion engines, particularly of the compression ignition type, wherein such pullover lubricant may result in engine overspeed operation. Any pullover of abrasive or undesirable impurities previously collected by the filter not only contaminates the supposedly filtered air but tends to form filter bypassing passages through the filter element and generally presents such impurities to the associated air induction device in extremely destructive concentrated quantities. Frequent service inspection, replacement, cleaning or repair of the filter element are often impossible as in the case of military or other equipment normally operated in remote places where replacement parts are not available or conditions are otherwise unsuitable for such maintenance. Such servicing of the filter unit often requires the shutting down of the associated air induction system which in certain installations may be extremely dangerous or at best impose economic nonworking burden on the equipment. In certain installations the servicing of such filter units may also be extremely dangerous due to the nature of the collected impurities. Self-cleaning air cleaners of the filter type have been devised and employed in the past, but generally such devices have been relatively large, complex and expensive and have failed to function as efficiently as claimed, and satisfactorily for any extended period of time.

The invention contemplates an improved self-cleaning air filter device for high displacement air induction systems which is compact, and has extremely high air cleaning efficiency, which is durable and easily accessible for operational inline inspection of the filter element, and which is of relatively simple, inexpensive construction. Such an improved self-cleaning air filter is particularly adapted for use with an internal combustion engine or

2 for a vehicle compartment ventilating system, and several forms of the invention are herein described as embodied in such environments for the purpose of illustration. However, the broader aspects of the invention are believed to be applicable to self-cleaning air filters generally.

The illustrative embodiments of the invention feature a self-cleaning air filter unit wherein a filter cartridge of annularly pleated external configuration is driven at a relatively low rotational speed through compound epicyclic planetary gearing by a relatively high speed air intake induction driven turbine to present the impurity collecting surfaces to a suitable vacuum nozzle cooperating therewith. The vacuum nozzle is pivotally mounted and resiliently biased to maintain proper vacuum sealing relation with the external surfaces of the filter cartridge and may be connected to any suitable vacuum source such as an exhaust aspirated eductor unit in an internal combustion engine or to a filter-unit-contained vacuum pump driven by the air induction driven turbine of the filter unit. The filter cartridge is of an improved resilient construction also tending to maintain the external impurity collecting surfaces thereof in proper sealing relation with the vacuum nozzle.

The foregoing and other objects, advantages and features of the invention will be understood from the following description of the several preferred embodiments thereof, having reference to the accompanying drawings wherein:

FIGURE 6 is a fragmentary view partly in section and partly in elevation showing the pivotal mounting of the vacuum nozzle and taken substantially in the plane of the line 6—6 of FIGURE 5;

FIGURE 7 is a fragmentary view partly in section and partly in elevation and taken substantially in the plane of the line 7—7 of FIGURE 3;

FIGURE 9 is a view similar to FIGURE 5 taken substantially in the plane of the line 9—9 of FIGURE 8; and FIGURE 10 is a fragmentary view partly in section and partly in elevation and taken substantially in the plane of the line 10—10 of FIGURE 9.

Figure 1:
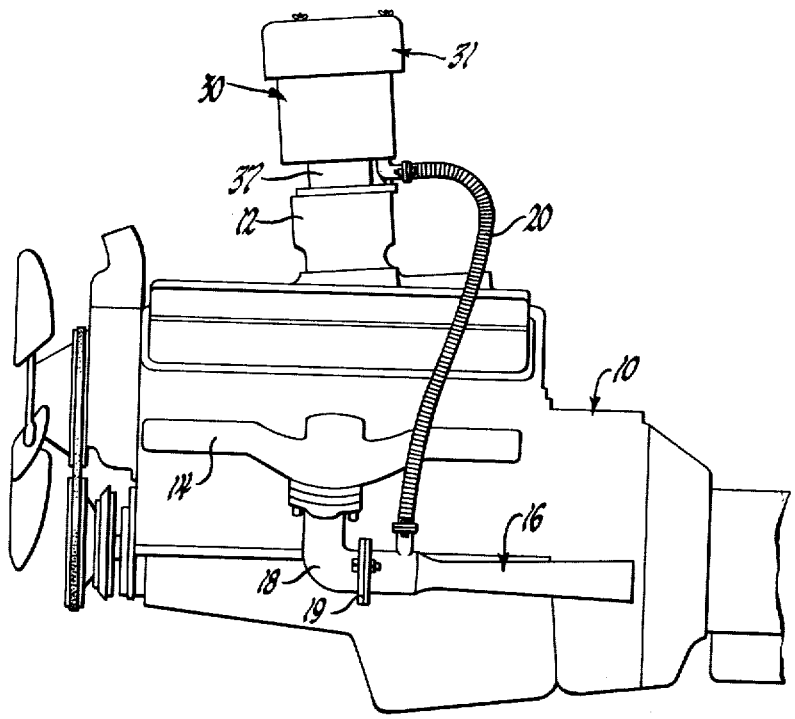
FIGURE 1 is a side elevational view of an internal combustion engine mounting an air cleaner embodying the invention.

Referring more particularly to FIGURE 1, a V-type internal combustion engine is indicated generally at 10. An air intake member 12, such as a carburetor for a four-cycle engine or a blower inlet for a two-cycle engine, is mounted intermediate the cylinder banks and serves to mount an air filter unit 30 which, in accordance with the invention, includes a filter-cleaning vacuum nozzle. An exhaust manifold 14 is mounted on the side face of each cylinder bank and serves the several cylinders thereof. An exhaust aspirated eductor unit 16 is connected to one of the manifold members 14 by an elbow fitting 18 and serves to generate and apply a suction to the vacuum nozzle of the air filter unit 30 through a suitable connection such as the flexible tubing shown at 20.

Figure 2:
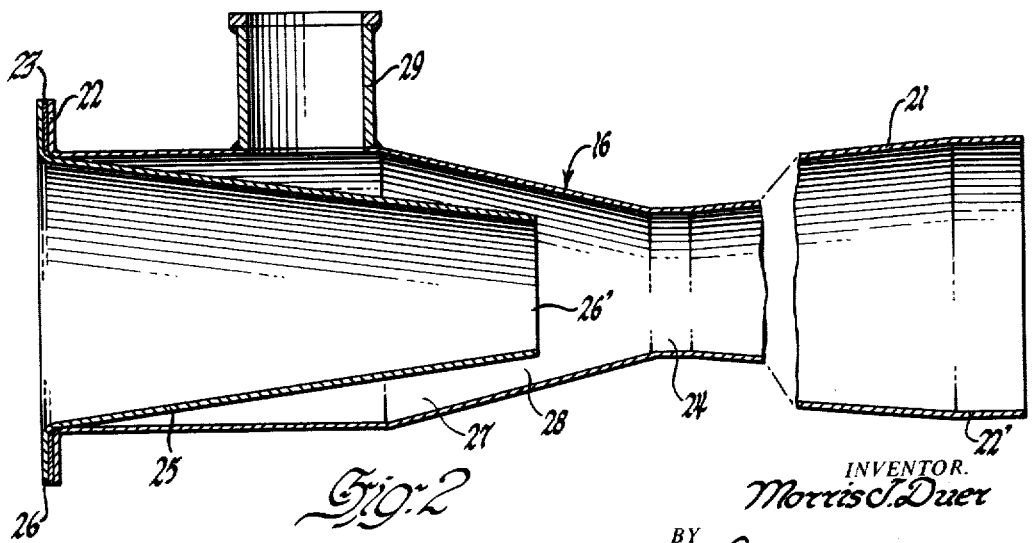
FIGURE 2 is a sectional view taken longitudinally of a preferred form of exhaust eductor assembly used in combination with the air cleaner of the invention as shown in FIGURE 1.

As best seen in FIGURE 2, the eductor unit 16 comprises an outer casing or conduit member 21 which is flanged at one end 22 for mounting by the manifold elbow 18 and has a cylindrical portion 22' adjacent its other end adapted to receive a clamped connection with a conventional exhaust pipe system, not shown. Where an exhaust silencer or muffler unit is provided in the exhaust system, it should be mounted intermediate the engine and the eductor unit to prevent any restriction to exhaust gas flow through the eductor unit. Intermediate its ends, the member 21 is shaped to define a venturi having a throat section at 24. A frusto-conical nozzle member 25 is mounted within the flanged end of the venturi conduit member 21 and has a flanged end 26 mating with the conduit flange 22. The nozzle member 25 is spacedly embraced by the flanged upstream end of the venturi conduit member 21 and terminates in a nozzle outlet 26' which is spaced slightly upstream of the venturi throat. The nozzle and conduit members thus define an annular chamber 27 therebetween having a restricted annular opening at 28 intermediate the outlet of the nozzle member and the adjacent converging side wall of the venturi member 22. The size of the opening 28 may be varied in accordance with the degree of filter cleaning vacuum required by shims 23 interposed between the flanged ends of the conduit and nozzle members, respectively. An elbow connection in the form of a cylindrical member 29 intersects the conduit member 21 intermediate the ends of the nozzle member 25 and connects the venturi aspirated chamber 27 to the air filter unit through the tubing 20.

As shown in FIGURES 3-7, the air filter unit 30 includes a cover or casing member 31. The cover member 31 comprises a dish-shaped sheet metal cover or hood 32 which has an end wall 32' closing one end of a cylindrical stone restricting intake screen 33 and a cylindrical side wall 32" spacedly embracing and defining a protective shield or baffle for the intake screen. The screen 33 is preferably formed or perforated sheet metal and is suitably secured adjacent its lower end to a cylindrical sheet metal member 34. The member 34 is in turn supported by a flange 35 which extends radially outwardly from an inner cylindrical portion 36 of a base member 37. The flange 35 of the base member thus cooperates with the entire cover member assembly 31 to define a filter mount- is preferably formed of perforated sheet metal and is suiting chamber 38 therebetween. The base member 37 is also flanged at 40 for mounting on the engine air intake member 12. The cylindrical portion 36 of the base member thus defines an outlet 41 from the filter chamber 38.

A plurality of deflector vanes 42 are formed integrally with the base member and extend radially inwardly and longitudinally from the cylindrical portion thereof. These vanes converge to a hub 44 having a central bore 46 therethrough. The lower portion of the hub 44 is flared radially outward at 45 and cooperates with the several vanes 42 and the side walls of the cylindrical portion 36 to define a plurality of flow velocity increasing nozzles 48. A support tube 50 is telescopically and non-rotatably mounted intermediate its ends in the bore of the hub 44, extending longitudinally upwardly therefrom to a point adjacent the upper end of the cover-defined chamber 38 and downwardly therefrom to a point adjacent the lower end of the air outlet 41.

The upper end of the support tube 50 carries a stationary ring gear 51 of a compound epicyclic gear train or mechanism 52. A second cup-shaped ring gear member 53 is journaled and supported by the external periphery and upper end face of the stationary ring gear member 51. The ring gear member 51 and 53 each have a different number of involute gear teeth, e.g. seventy-two and seventy-three, respectively, and both engage three planetary gears 54 which are rotatably mounted in equiangularly spaced relation on a floating planetary carrier 55 and driven by a sun gear 56. In the illustrative embodiment the planetary gears each have thirty-one teeth and the sun gear has nine. The carrier 55 is mounted in end thrust bearing relation to the two ring gears but is free to float radially to equalize the driving relation between the several gears. The sun gear 56 is drivingly connected to an intake suction driven turbine wheel 58 by a shaft 59 which extends through and is journaled in the support tube 50. Although the planetary gears engage ring gears of different gear tooth number, the necessary clearances and only slight difference in gear tooth configuration will generally permit the use of planetary gears 54 having a single gear tooth configuration. However, the several gears are preferably cast or otherwise formed of nylon or other suitable thermosetting plastic material. When so formed, two of the three planetary gears are preferably provided with two side-by-side bands of gear teeth 54' and 54". On one of these two gears, the upper band 54' leads the lower 54" by one-third of a tooth and on the other the upper band trails the lower by one-third of a tooth. The teeth on the third planetary gear are preferably straight. This preferred staggered tooth construction of the several planetary gears allows or insures free involute rolling engagement between the several gear members.

A filter cartridge assembly 60 is drivingly connected to and supported at its upper end by the ring gear member 53. The cartridge assembly 60 comprises an outer shell 63 which is made of a plurality of annular flat pieces 64 and a circular end piece 65 of felt material suitably bonded together adjacent their inner and outer peripheries and reinforced by annular wire beads 66 and 66' to provide an annularly pleated bellows configuration. This outer shell is supported inwardly by an inner cylindrical screen 67. The upper end piece 65 of the outer shell is clamped between two plates 68 and 68' which close the upper end of the screen 67 and are secured to the upper ring gear 53 to provide a driving connection for the cartridge unit. The inner periphery of the felt piece defining the lower portion of the outer shell is suitably secured by a wire clamping ring 69' against a groove-defined shoulder formed in a cylindrical journal member 69 which is secured to the lower end of the inner screen 67 and rotatably mounts the lower end of the cartridge unit with respect to the upper end of the cylindrical portion of the base member 37. The cartridge journal member 69 further defines a groove for mounting a Teflon bearing 61 and a felt seal 62 intermediate the cartridge and base member. The several annular spaces defined intermediate the inner screen and outer felt shell are filled with a resilient latex-impregnated fiber material 70, such as hair or spun glass, which prevents collapse of the felt bellows under engine intake vacuum conditions and tends to maintain the felt material in proper sealing relation with the filter cleaning vacuum nozzle.

Under engine operating conditions air enters the filter chamber 38 through the intake screen and is drawn through the felt and hair packing of the filter cartridge. This engine intake air flow rotatably drives the turbine 58 which in turn drives the filter cartridge by means of the shaft 59 and the compound epicyclic gear train 52 at a relatively slow speed, e.g. up to 3 and 6 r.p.m. at maximum engine speed corresponding to an air induction capacity of approximately 450 c.f.m. in typical installations having corresponding designed turbine speeds of 2,000 and 4,000 r.p.m. This rotation carries the filter surfaces of the cartridge slowly past vacuum nozzle openings 71 bisecting hollow sawtooth fingers 72 of a pivotally mounted but otherwise relatively stationary vacuum nozzle and manifold member 73.

As best seen in FIGURE 6, the nozzle and manifold member 73 is preferably formed of a suitable plastic material of some resiliency and comprises a nozzle portion 74 including the filter-engaging sawtooth nozzle fingers 72 and a manifold portion 75 extending arcuately of the filter cartridge. A cylindrical outlet 76 extends downwardly of the manifold portion at its end distal from the nozzle portion. A flange 77 extending radially inwardly of the upper end of the nozzle and manifold member 72 is pivotally supported at its end distal from the nozzle portion by a pin 78 which is carried by a base supported cage 79 consisting of two intersecting straps 80 and 81. The outlet 76 is spacedly embraced by an opening 35' extending through the base flange 35 and is pivotally mounted and sealed with respect to an elbow fitting 83 by a sleeve coupling member 84 of resilient material above the same pivotal axis provided by the pin 78. The elbow 83 is supported by the base flange 40 and its upper end is sealingly embraced by the resilient sleeve 76. The opposite end of the elbow 83 is connected to the end of the flexible tube 20 distal from the vacuum creating exhaust eductor unit 16.

Figure 3:
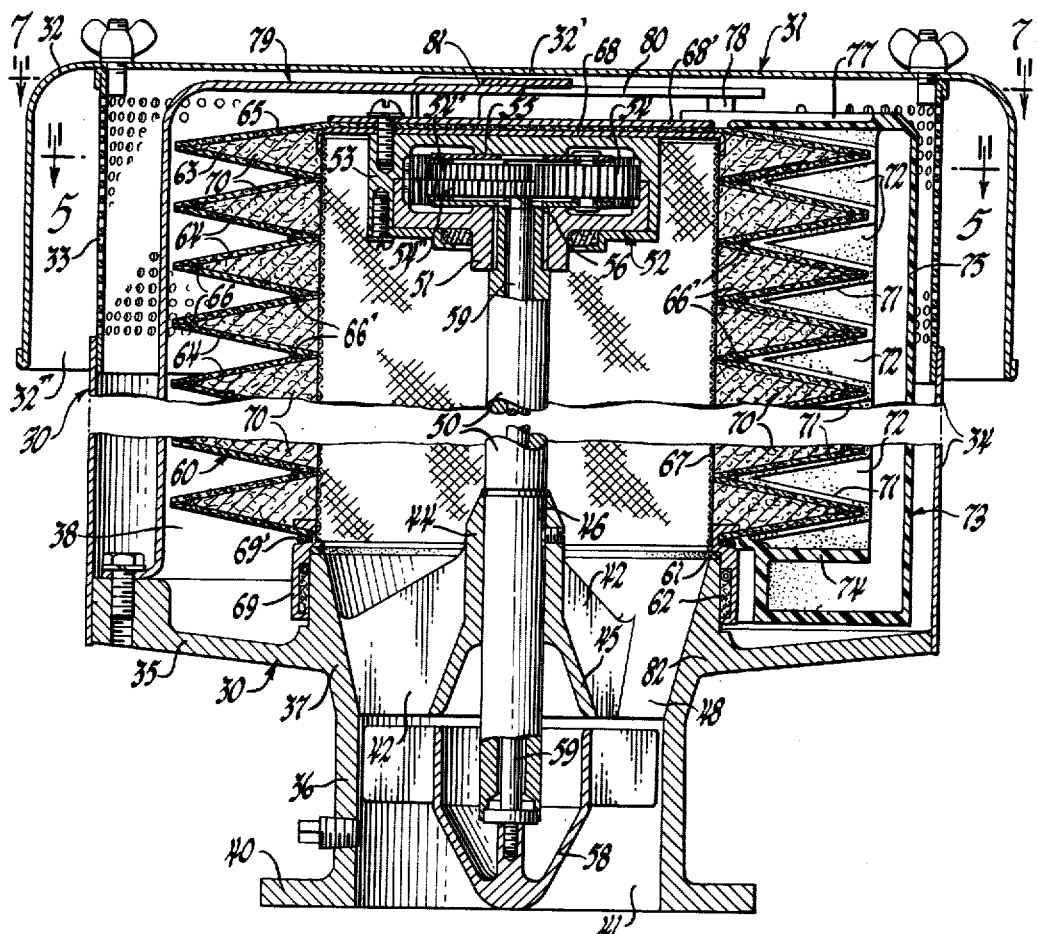
FIGURE 3 is a sectional view of the air cleaner shown in FIGURE 1 and is taken substantially on the line 3—3 of FIGURE 5.
Figure 4:
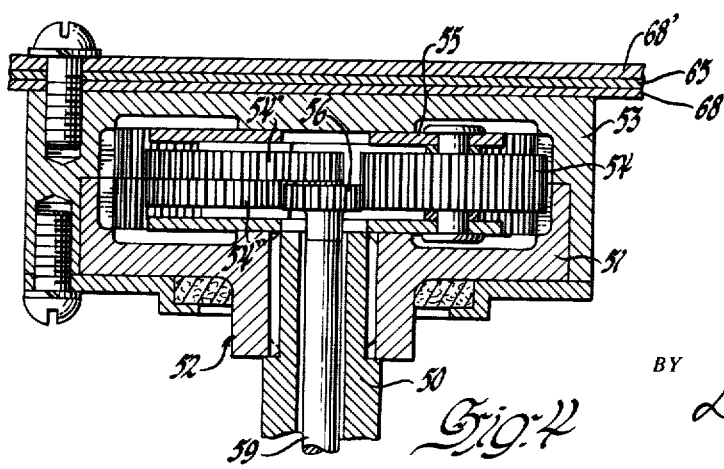
FIGURE 4 is an enlarged view similar to and showing a portion of FIGURE 3 in greater detail.

As indicated above and best seen in FIGURES 3 and 10, the sawtooth fingers 72 of the nozzle member are complementary to the configuration of the outer shell of the filter and are provided with nozzle openings 71 in the form of longitudinally aligned slits through which the exhaust induced vacuum is applied to the external filter surfaces of the outer shell. The vacuum thus applied to the nozzle member and openings causes a filter cleaning reverse flow or backwash of air through the filter media.

Figure 5:
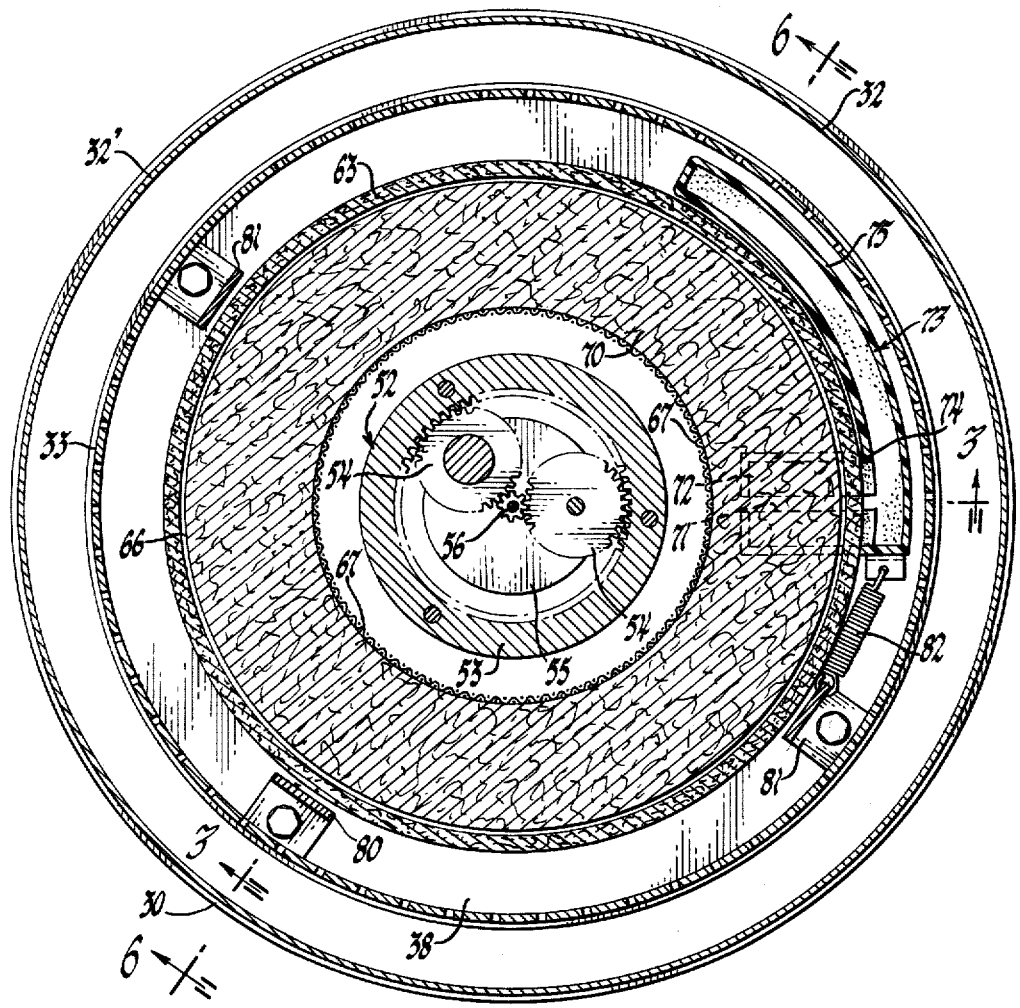
FIGURE 5 is a transverse sectional view taken substantially in the plane of line 5—5 of FIGURE 3.

As shown in FIGURE 5, the nozzle end of the member 73 is resiliently biased against the cartridge by a spring 82 which is connected to the adjacent strap 81 of the cage 79. This insures proper sealing action between the nozzle fingers and the felt pleats of the outer shell which tend to be concavely depressed slightly by the engine intake suction applied thereto in opposition to the resiliency of the packing 70. Upon entering the nozzle, the vacuum applied and the resiliency of the packing 70 causes an outward deflection of the felt material which serves to loosen the dirt collected thereon and further insures a proper seal between the felt shell and the opening-defining surfaces of the nozzle fingers. Again referring to FIGURE 10, it will be noted that the filter-engaging edges of the nozzle fingers 72 are rounded to provide a tapered surface adapted to gently engage the filter surface and dirt particles collected thereon. Due to the relatively slow rotational speed of the filter cartridge the collected dirt particles are thus accommodated by the resiliency of the felt and packing material without destructive abrasion of the felt and plastic materials of the filter and nozzle members, respectively.

Figure 8:
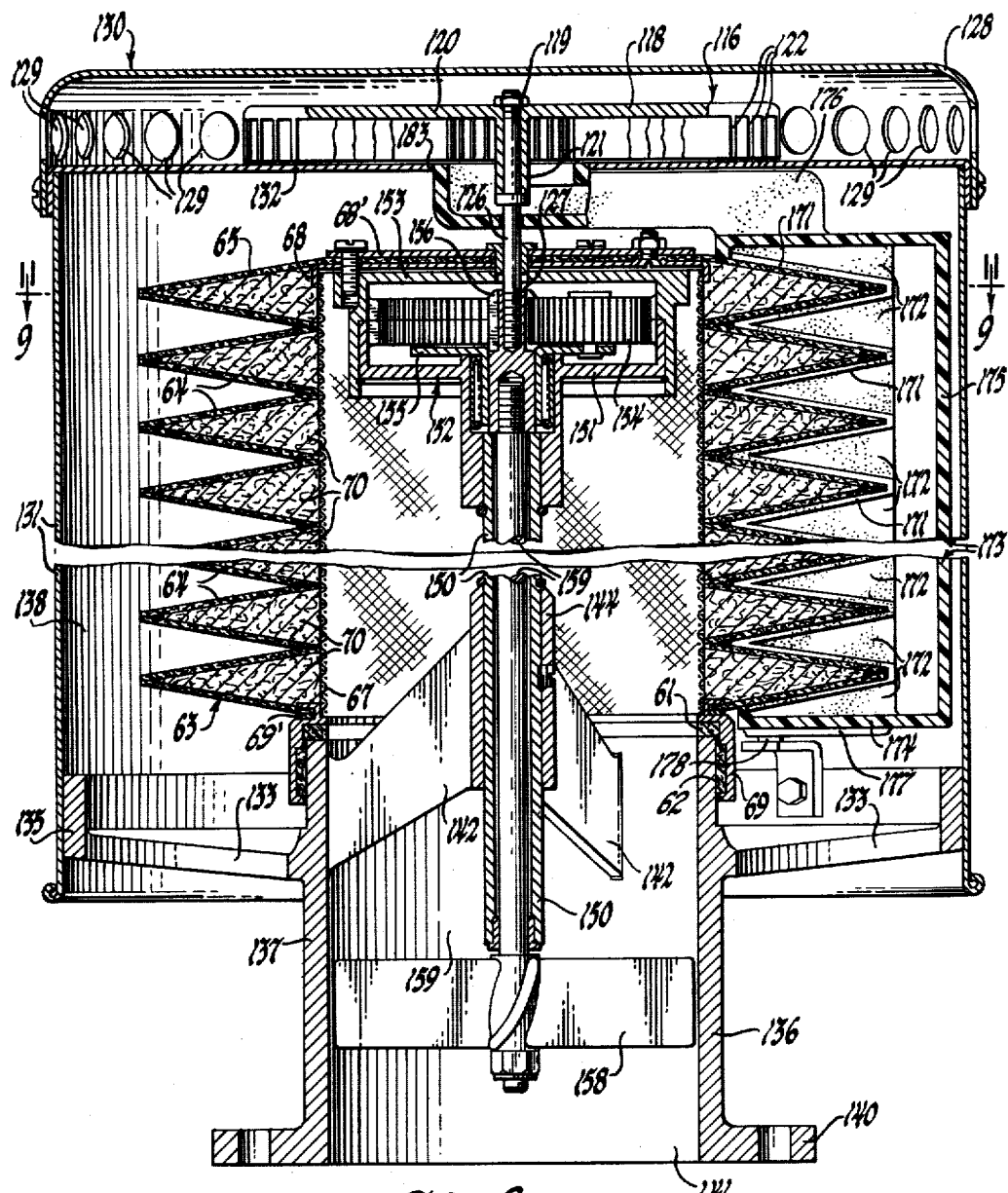
FIGURE 8 is a view similar to FIGURE 3 showing a modified form of air cleaner embodying the invention and having a self-contained vacuum source.

In the form of the invention of FIGURES 8 and 9, a self-cleaning air cleaner 130 is shown which is adapted for mounting on the air intake of a vehicle compartment ventilating system or the like. The air cleaner 130 is similar to that previously described with reference to FIGURES 1-8 differing primarily therefrom in that a filter cleaning vacuum nozzle and manifold member 173 is connected to the inlet of a vacuum pump 116 which is directly driven by the shaft of a ventilating system air intake driven turbine 158.

The air cleaner 130 includes a cylindrical sheet metal casing member 131 which closes at its upper end by a cover member 132 and at its lower end by a peripheral flange 135 of a base member 137 to define a filter mounting chamber 138 therebetween. The base flange 135 is perforated to provide a plurality of equi-angularly spaced intake ports 133 embracing an inner cylindrical portion 136 of the base member which defines an outlet 141 from the filter chamber 138. The base member 137 is also flanged at 140 for mounting on the air intake of a vehicle compartment ventilating system or the like.

As in the above-described air cleaner, a plurality of deflector vanes 142 extend radially inwardly and longitudinally from the outlet defining cylindrical portion of the base member converging to a hub 144 which non-rotatably mounts a hollow support tube 150 extending therethrough. The upper end of the tube 150 carries a stationary ring gear 151 of a compound epicyclic gear train mechanism 152 which is basically similar to that described above. A second cup-shaped ring gear member 153 is journaled and supported by the external periphery and upper end face of the stationary ring gear member 151. The ring gear members 151 and 153 engage one or more planetary gears 154, only one of which is shown. The planetary gears 154 are each rotatably journaled on a planetary carrier 155 which is journaled by suitable bearings carried by the support tube mounted hub of the ring gear 151. A sun gear 156 drivingly engages the planetary gears 154 and is drivingly connected to the air induction driven turbine 158 by a shaft 159 extending through and journaled in the support tube 150.

The filter cartridge assembly of the air cleaner 130 is substantially identical with that shown and described with reference to FIGURES 3-7 and the same reference numerals have been applied to corresponding elements thereof as shown in FIGURES 8 and 9. Under air inducting operation of the vehicle ventilating system, air is drawn into the filter chamber 138 through the several intake ports 133 and through the felt and hair packing of the filter cartridge. The air flowing through the filter outlet passage 141 rotatably drives the turbine 158 which in turn rotatably drives the filter cartridge at a relatively slow speed through the compound epicyclic gear train 152. This rotation carries the filter surfaces of the cartridge past vacuum nozzle openings 171 which bisect hollow sawtooth fingers 172 of a substantially stationary vacuum nozzle and manifold member 173.

The nozzle and manifold member 173 is formed of a suitable resilient plastic material and comprises a nozzle portion 174 including the filter-engaging sawtooth nozzle fingers 172 and a manifold portion 175 extending arcuately of the filter cartridge. In this form of the invention a vacuum outlet duct 176 extends radially inwardly from the end of the manifold portion distal from the nozzle portion to a central opening 183 provided in the cover member 132. The lower end of the nozzle and manifold member 173 has a flange 177 extending radially inwardly therefrom which is pivotally supported at its end distal from the nozzle portion by a pin 178 which is carried by the peripheral flange of the base member 137. The connection of the vacuum outlet duct with the manifold portion and the pivot pin 178 are substantially coaxial and effectively serve to provide a pivot axis for the flexing of the nozzle member which is biased by a spring 182 extending between a base supported strap 181 and the nozzle end of the member 173. The sawtooth nozzle fingers 172 of the member 173 thus cooperate with the outer shell of the filter cartridge 60 in the same manner as those of the previously described nozzle member 73.

The inner end of the vacuum outlet duct 176 serves as a central inlet 183 for the vacuum pump 116. The vacuum pump 116 is of a centrifugal type and includes an impeller 118. The vacuum impeller 118 has a web portion 120 extending radially outwardly from a central hub portion 121 and a plurality of spirally formed vanes 122 depending from the web portion cooperates with the adjacent surface of the cover member 132 to define a plurality of air pumping, vacuum inducing passages. The impeller 118 is drivingly connected to the turbine driven shaft 159 through a shaft extension member 126 which projects through the duct 176, the adjacent upper end of the filter cartridge, and the cup-shaped ring gear 153 to threadably and drivingly engage a tapped hole 127 extending longitudinally of the sun gear pinion 156. As the vacuum impeller is directly connected to the turbine 158 and driven thereby at relatively high speeds, sufficient vacuum is created to adequately clean the surfaces of the filter shell. The vacuum pump 116 is enclosed by a simple sheet metal cover member 128 which is secured to the upper end of casing and cover members 131 and 132.

The cover member 128 is provided with a plurality of ports 129 through which air and dirt particles backwashed from the filter media can be discharged.

While only two preferred forms of the invention have been shown and described herein for illustrative purposes, it will be appreciated by those skilled in the art that various changes might be made therein without departing from the spirit and scope of the invention, as defined in the following claims.

I claim:

1. A self-cleaning air filter mechanism adapted for use in an air induction system and comprising a casing defining an air flow passage connectable to the air induction system, a filter element supported for rotation within said casing and intersecting the air flow passage therethrough, a hollow nozzle member mounted within said casing and having a nozzle opening therein maintained in sealing engagement with the filter surfaces of said element, vacuum generating means including an impeller rotatably supported by said casing and adapted to provide a suction source, conduit means interconnecting said nozzle member with said vacuum generating means whereby the generated suction applied to said nozzle member causes reverse filter cleaning air flow to be effected through the filter element and nozzle opening, and power means for rotating said filter and vacuum generating impeller, said power means including a turbine mounted in said passage and adapted to be rotatably driven by the air intake flow induced therethrough, drive reduction means intermediate said turbine and said filter element whereby said filter element is rotatively driven at a relatively slow speed, and means drivingly interconnecting said impeller and said turbine.

2. A self-cleaning air filter mechanism adapted for use in an air intake system and comprising a casing defining an inlet opening and having an outlet opening therein connectable to the air intake system, a filter element supported for rotation within said casing intermediate said inlet and outlet openings, said filter element including an inner perforated cylindrical support member defining an outlet chamber connected to said outlet opening, an outer cylindrical member of bellows configuration having a plurality of annularly extending pleats, said outer cylindrical member being of suitable filter material and secured at the opposite ends thereof to said support screen member, annular wire members reinforcing the inner and outer peripheries of said pleats and a pervious and resilient packing material interposed between said inner and outer filter members, a nozzle member mounted within said casing and including a plurality of hollow, tapered fingers extending radialy inwardly and engaging the adjacent pleats of said outer filter member, said tapered fingers having longitudinally aligned slots therethrough defining nozzle openings therein, vacuum pump means including an impeller rotatably supported by said casing and adapted to provide a suction source, conduit means interconnecting said nozzle member with said vacuum pump means whereby a reverse filter cleaning air flow is effected through the filter element, and power means for rotating said filter element and vacuum pump including a turbine mounted in said outlet and adapted to be rotatably driven by the air intake flow induced therethrough, drive reduction means intermediate said turbine and said filter element whereby said filter element is rotatively driven at a relatively slow speed, and means for drivingly connecting said vacuum pump impeller to said turbine.

3. A self-cleaning air filter mechanism adapted for use in an air induction system and comprising a casing defining an air flow passage connectable to the air induction system, a filter element supported for rotation within said casing and intersecting the air flow therethrough, said filter element including an inner pervious cylindrical support member defining an outlet chamber, an outer cylindrical member of bellows configuration having a plurality of annularly extending pleats, said outer cylindrical member being of suitable filter material and secured at the opposite ends thereof to said support member, annular wire members reinforcing the inner and outer peripheries of said pleats and a pervious and resilient packing material compressively interposed between said inner and outer filter members, a nozzle member mounted within said casing and including a plurality of hollow, tapered fingers extending radially inwardly and engaging the adjacent pleats of said outer filter member, said tapered fingers having longitudinally aligned slots therethrough defining nozzle openings therein, said packing material resiliently maintaining said outer filter member in sealing engagement with the nozzle opening defining portions of said nozzle fingers, means for applying a vacuum suction to said nozzle member thereby causing a reverse filter cleaning air flow to be effected through the filter element and said nozzle openings and power means for driving said filter element at a slow rotational speed relative to said nozzle member and opening.

4. In an air filter mechanism as set forth in claim 3, said power means for rotating said filter element including a turbine mounted in said air flow passage and adapted to be rotatably driven at a relatively high speed by the air flow induced therethrough and drive reduction means intermediate said turbine and said filter element whereby said filter element is rotatively driven at the relatively slow speed.

5. In an air filter mechanism as set forth in claim 4, said vacuum suction applying means including a vacuum pump drivingly connected to said turbine.

6. An air filter system for use with an internal combustion engine having an air intake and an engine exhaust and including a filter device comprising a casing defining an inlet chamber and having an outlet opening therein connectable to the air intake of the engine, a filter element supported for rotation within said casing intermediate said inlet chamber and outlet opening, said filter element including an inner pervious cylinderical support member defining an outlet chamber connected to said outlet opening, an outer cylindrical member of bellows configuration having a plurality of annularly extending pleats, said outer cylindrical member being of suitable filter material and secured at the opposite ends thereof to said support member, and a pervious and resilient packing material compressively interposed between said inner and outer filter members, a nozzle member mounted within said casing and including a plurality of hollow, tapered fingers extending radially inwardly and engaging the adjacent pleats of said outer filter member, said tapered fingers having longitudinally aligned slots therethrough defining nozzle openings therein, said packing material resiliently maintaining said outer filter member in sealing engagement with the nozzle opening defining portion of said nozzle fingers, means for rotatively driving said filter element including a turbine mounted in said outlet and adapted to be rotatably driven by the air intake flow induced therethrough by the engine, eductor means associated with said engine exhaust and adapted to generate a suction, and conduit means interconnecting said nozzle member with said eductor means thereby applying the eductor generated suction to said nozzle member and causing a reverse filter cleaning air flow through said filter element and nozzle member.

7. In an air filter system as set forth in claim 6, said filter element driving means further including drive reduction means intermediate said turbine and filter element whereby said filter element is rotatively driven at a speed slower than that required to centrifuge air flow deposited impurities from the inlet chamber exposed surfaces of said outer filter member.

8. An air filter device adapted for use with an internal combustion engine and the like having an air induction system, said filter device including a casing defining an inlet chamber and having an outlet opening therein connectable to the air induction system, a filter element supported for rotation within said casing intermediate said inlet chamber and said outlet opening, means for rotatively driving said filter element including a turbine rotatably mounted with respect to said casing within said outlet opening and adapted to be rotatably driven by the air flow induced through said device by the air induction system and drive reduction means intermediate said turbine and filter element, said drive reduction means having a reduction ratio whereby said filter element is rotatively driven at a speed substantially slower than that required to centrifuge air flow deposited impurities from the inlet chamber exposed surface of said filter element, a nozzle member mounted within said casing and having a nozzle opening therein maintained in sealing engagement with the inlet chamber exposed surface of said filter element, means for applying suction to said nozzle member and nozzle opening thereby causing a reverse filter cleaning air flow through said filter element and nozzle opening, said suction applying means including a vacuum pump rotatably driven by said turbine.

9. An air filter device adapted for use with an internal combustion engine and the like having an air induction system, said filter device including a casing defining an inlet chamber and having an outlet opening therein connectable to the air induction system, a filter element supported for rotation within said casing intermediate said inlet chamber and said outlet opening, means for rotatively driving said filter element including a turbine rotatably mounted with respect to said casing within said outlet opening and adapted to be rotatably driven by the air flow induced through said device by the air induction system and drive reduction means intermediate said turbine and filter element, said drive reduction means having a reduction ratio whereby said filter element is rotatively driven at a speed substantially slower than that required to centrifuge air flow deposited impurities from the inlet chamber exposed surface of said filter element, a nozzle member mounted within said casing and having a nozzle opening therein maintained in sealing engagement with the inlet chamber exposed surface of said filter element, means for applying suction to said nozzle member and opening thereby causing a reverse filter cleaning air flow through said filter element and nozzle opening, said suction applying means including a vacuum pump rotatably driven by said turbine.

References Cited in the file of this patent

UNITED STATES PATENTS

| | | |
|---|---|---|
| 1,125,727 | Saccaggio | Jan. 19, 1915 |
| 1,302,716 | Sargent | May 6, 1919 |
| 1,649,220 | Goodloe | Nov. 15, 1927 |
| 1,948,791 | Halstead | Feb. 27, 1934 |
| 2,026,834 | Holly | Jan. 7, 1936 |
| 2,130,555 | Malcom | Sept. 20, 1938 |
| 2,398,233 | Lincoln | Apr. 9, 1946 |
| 2,474,478 | Hart | June 28, 1949 |
| 2,601,704 | Streun | July 1, 1952 |
| 2,795,291 | Pierce | June 11, 1957 |
| 2,889,007 | Lunde | June 2, 1959 |

FOREIGN PATENTS

| | | |
|---|---|---|
| 108,230 | Sweden | Aug. 17, 1943 |
| 348,158 | Italy | May 12, 1937 |

UNITED STATES PATENT OFFICE
CERTIFICATE OF CORRECTION

Patent No. 3,104,962 September 24, 1963

Morris J. Duer

It is hereby certified that error appears in the above numbered patent requiring correction and that the said Letters Patent should read as corrected below.

Column 3, line 42, for "or" read -- of --; line 49, strike out "is preferably formed of perforated sheet metal and is suit-"; line 59, for "outward" read -- outwardly --; same column 3, line 73, for "member" read -- members --; column 5, line 13, for "above" read -- about --; column 7, line 51, for "radialy" read -- radially --.

Signed and sealed this 7th day of July 1964.

(SEAL)
Attest:

ERNEST W. SWIDER
Attesting Officer

EDWARD J. BRENNER
Commissioner of Patents